(12) United States Patent
Oueslati et al.

(10) Patent No.: US 7,894,340 B2
(45) Date of Patent: Feb. 22, 2011

(54) METHOD AND A DEVICE FOR FLOW MANAGEMENT IN A PACKET-SWITCHED TELECOMMUNICATIONS NETWORK

(75) Inventors: Sarah Oueslati, Chatillon (FR); James Roberts, Voisins le Bretonneux (FR); Nabil Benameur, Paris (FR)

(73) Assignee: France Telecom, Paris (FR)

( * ) Notice: Subject to any disclaimer, the term of this patent is extended or adjusted under 35 U.S.C. 154(b) by 170 days.

(21) Appl. No.: 11/884,436

(22) PCT Filed: Feb. 13, 2006

(86) PCT No.: PCT/FR2006/050125
§ 371 (c)(1),
(2), (4) Date: Nov. 23, 2007

(87) PCT Pub. No.: WO2006/085039
PCT Pub. Date: Aug. 17, 2006

(65) Prior Publication Data
US 2008/0212475 A1    Sep. 4, 2008

(30) Foreign Application Priority Data
Feb. 14, 2005  (FR) .................................. 05 01454

(51) Int. Cl.
*H04L 12/26* (2006.01)
(52) U.S. Cl. ..................................................... 370/230
(58) Field of Classification Search ................ 370/230, 370/231, 235, 253, 468
See application file for complete search history.

(56) References Cited

U.S. PATENT DOCUMENTS

| | | | |
|---|---|---|---|
| 4,920,509 A * | 4/1990 | Hmida et al. | ............... 708/702 |
| 6,829,217 B1 | 12/2004 | Bechtolsheim et al. | |
| 2002/0116527 A1 | 8/2002 | Chen et al. | |
| 2003/0231590 A1 | 12/2003 | Zhao et al. | |
| 2009/0097406 A1 * | 4/2009 | Nilakantan et al. | ........... 370/235 |

OTHER PUBLICATIONS

Kim, Yoohwan et al., "High-Speed Router Filter for Blocking TCP Flooding under DDos Attack", D2: XP 10642220, 2003, pp. 183-190.

* cited by examiner

*Primary Examiner*—Dang T Ton
*Assistant Examiner*—Nourali Mansoury
(74) *Attorney, Agent, or Firm*—Cohen Pontani Lieberman & Pavane LLP

(57) ABSTRACT

Management of the activity status of flows in a packet-switched telecommunications network is disclosed. For each packet received belonging to the flow, the location of a flow register in a data structure is determined from an identifier of the flow. An activity status of the flow is determined from an activity credit in the determined flow register. The flow is considered inactive if the activity credit has expired. An updating process progressively and simultaneously reduces the activity credits of the active flows, so that if a flow that has been determined active does not receive a packet during at least the time-out period, the credit of the flow expires at the end of the time-out period.

10 Claims, 2 Drawing Sheets

METHOD AND A DEVICE FOR FLOW MANAGEMENT IN A PACKET-SWITCHED TELECOMMUNICATIONS NETWORK

RELATED APPLICATIONS

This is a U.S. National Stage of International Application No. PCT/FR2006/050125 filed on Feb. 13, 2006.

BACKGROUND OF THE INVENTION

1. Field of the Invention

The present invention relates to a method of flow management in a packet-switched telecommunications network, more particularly in a network implementing the Internet Protocol (IP).

Although this is not limiting on the invention, the invention applies especially to methods used to meet the requirements of a flow-level admission control mechanism.

2. Background of the Invention

In the context of the present invention, a flow is identified by a set of attributes present in the header of the packets that constitute it (examples of attributes are source and destination IP addresses, source and destination ports, protocol, flow label, etc.).

All packets having the same values of these attributes constitute a flow.

At any given time, a flow is considered to be active if the time that has elapsed since observation of its last packet is less than a predetermined time-out period (which is typically of the order of a few seconds).

Proposed below is a solution for determining with a certain probability whether a packet received, for example over a link, belongs to an active flow or to a new flow.

The invention proposes a solution for determining with a certain probability whether a packet received, for example over a link, belongs to an active flow or to a new flow.

The proposed solution has the following particular feature: any flow identified as new is certain to be new.

Nevertheless, it is accepted that certain new flows are not detected.

The problem of detecting new flows arises in the context of a "flow aware" network architecture.

In such an architecture, new flows are identified "on the fly", i.e. when packets are detected, and are subject to implicit admission control, without using signaling.

This form of admission control rejects packets that belong to new flows if a link or a path is congested, for example.

Proposed below is a much less complex solution to the problem of detecting new flows in the context of implicit admission control. It can advantageously be used for other applications, for example for counting flows.

A mechanism for identifying new flows that is based on detecting the SYN or SYNACK packet that signals the setting up of a TCP connection is known in the art, in particular from the document "Non-intrusive TCP Connection Admission Control for Bandwidth Management of an Internet Access Link", IEEE Communication Magazine, May 2000 (Kumar, Hegde et al.). That method therefore applies only to applications using the TCP transport protocol.

A mechanism for identifying new flows based on keeping a list of all the current flows is known from the document "Quality of service and flow-aware admission control in the Internet", Computer Networks, Vol. 40, pages 57-71 (Benameur et al.).

That mechanism has the drawback that it is necessary to delete flows from the list at the end of an inactivity time greater than the flow time-out period, failing which there would be a risk of saturation and, in any event, an increase in the time to look up a flow in the list.

Solutions enabling new flows to be identified in real time are known from the document "Designs for High-Speed Routers: Architecture and Performance Evaluation", IEEE Transactions on Computers, Vol. 51, No. 9, September 2002, (Singhal et al.). One of those solutions also uses a data structure of variable size that cannot be addressed directly (a table combined with a chained list), and the time taken to look up a flow in the storage structure therefore increases with the number of flows. The other proposed solution requires the use of additional overflow memories if it is no longer possible, for want of space, to insert a new flow into the main data structure.

SUMMARY OF THE INVENTION

One aspect of the present invention is directed to a method of managing flows in a packet-switched telecommunications network, a flow being considered active in the network if the time elapsed since detection of the last packet of the flow is less than a predetermined time-out period, the method comprising:

for each packet received belonging to a given flow;
  a step of determining, from an identifier of the flow, the location of a flow register in a data structure of fixed size, the structure including a plurality of flow registers;
  an initialization step during which an initial credit representing the activity of the flow is stored in the flow register; and
  an updating process comprising progressively and simultaneously reducing the activity credits associated with all the flows so that the credit of the flow expires at the end of the time-out period, starting from the initialization of the credit.

Thus the flow management method according to an embodiment of the invention is based on a data structure of fixed size, with each flow being addressable directly. This feature advantageously limits the time taken to look up a flow in the structure, and also ensures lookup time is constant.

What is more, and this is particularly advantageous, there is no step of purging the structure as such. Each flow is associated with a credit representing its activity, that credit diminishing regularly for all the flows managed by the method.

The method preferably includes a step of computing an image value of the identifier of said flow using a function for associating with the flow identifiers image values belonging to a finite set of image values which correspond to respective directly addressable inputs of the fixed size data structure.

In a preferred implementation these methods include a step of determining the activity of a flow from the data structure and a step of controlling admission of a packet if it belongs to a new flow.

It is very advantageous if the data structure is read by addressing the register of the flow concerned directly during the determination step. This direct addressing mode avoids the requirement to store the identifier of the flow in the data structure and simplifies the operation of looking up the flow. Furthermore, the invention dispenses with identifying flows that are no longer active and eliminating them. In the invention, a new flow might not be recognized as such if another active flow is already using the corresponding flow register (this constitutes a "false positive" type error).

In contrast, any flow signaled as new is certain to be new: there are no "false negative" type errors. Note that for the admission control application it is important to avoid false negative errors that could interrupt a flow in progress, whereas a relatively high rate of false positive errors (for example up to 10%) is compatible with the essential objective of overload control.

The management method of the invention has a number of variants.

In a first variant, the flow register comprises a predetermined number of bits. In this first variant:
- during the initialization step, a first binary value is stored in each of the bits; and
- during the updating process, a second binary value is stored in each of the bits one by one, cyclically, and at a given frequency, the activity credit at a given time consisting of the number of bits of the flow register that store the first binary value.

This first variant is particularly advantageous because it lends itself well to hardware implementation because of the simplicity of the logic operations that it entails. Moreover, "false positive" type errors are caused entirely by the use of a hash function for the flow addressing requirement.

In a second variant:
- during the initialization step, the value of a counter increased by a predetermined initial credit is stored in the flow register; and
- during the updating process, the counter is incremented cyclically, the activity credit at a given time consisting in the difference between the content of the flow register and the current value of the counter.

This second variant has the advantages that it lends itself to simple software and hardware implementation and accommodates the use of a standard memory (organized into words of 8×n bits) for storing the flow registers.

Another aspect of the invention is directed to a device for managing flows in a packet-switched telecommunications network, a flow being considered active in the network if the time elapsed since detection of the last packet of that flow is less than a predetermined time-out period, the device including:
- means for receiving packets;
- means for determining from a flow identifier of a packet the location of a flow register in a data structure of fixed size including a plurality of flow registers;
- initialization means adapted to store an initial credit representing the activity of the flow in the flow register; and
- updating means adapted to reduce progressively and simultaneously the activity credits associated with all the flows so that the credit of the flow expires at the end of the time-out period, starting from the initialization of the credit.

In a preferred implementation, the various steps of the flow management method are determined by instructions of computer programs.

Consequently, an aspect of the invention is directed to a computer program on an information medium that includes instructions adapted to execute a flow management method as described above.

That program can use any programming language and can take the form of source code, object code or an intermediate code between source code and object code, such as a partially compiled form, or any other desirable form.

Another aspect of the invention is directed to a computer-readable information medium that contains instructions of a computer program.

The information medium can be any entity or device capable of storing the program. For example, the support can include storage means, such as ROM, for example a CD ROM or a microelectronic circuit ROM, or magnetic storage means, for example a diskette (floppy disk) or a hard disk.

The information medium can be a transmissible medium such as an electrical or optical signal, which can be routed via an electrical or optical cable, by radio or by other means. The program of the invention can in particular be downloaded over an Internet-type network.

Alternatively, the information medium can be an integrated circuit into which the program is incorporated, the circuit being adapted to execute or to be used in the execution of the method in question.

DETAILED DESCRIPTION OF THE DRAWINGS

Figure 1:
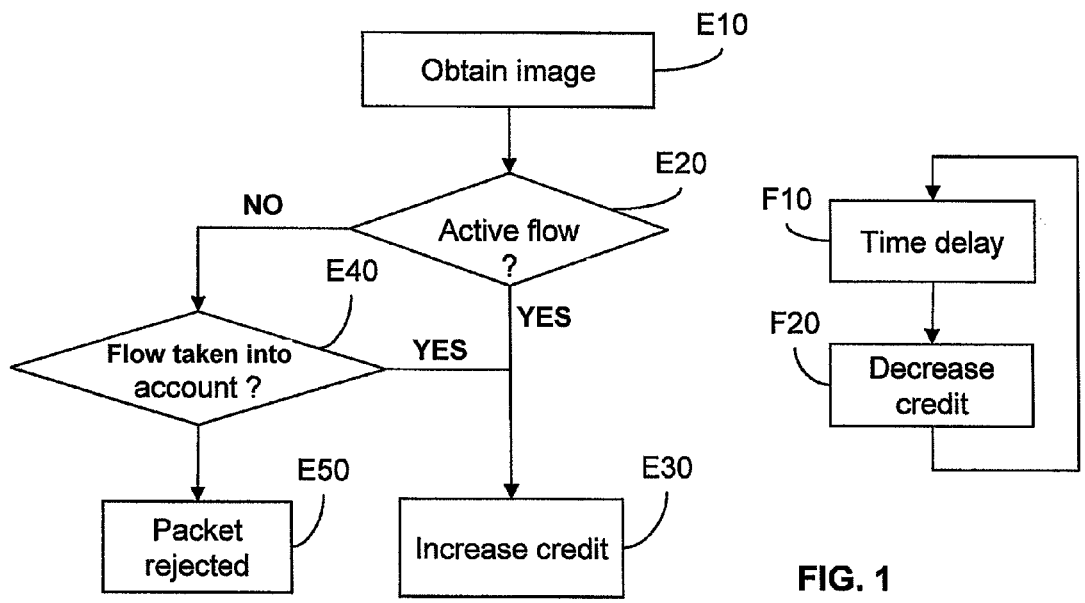
FIG. 1 represents one preferred implementation of a flow management method of the invention.

FIG. 1 represents a flow management method according to the invention.

A flow is defined here as a series of packets that are closely spaced in time and have common header attributes (IP address, protocol, port number, flow label, etc.).

A flow is considered to be active in the network if the time that has elapsed since detection of the last packet of that flow is less than a predetermined time-out period TO.

In the preferred implementation described here, this method includes two independent processes, namely an initialization process, which is executed on detecting a packet of a flow that is to be taken into account, and an updating process.

In FIG. 1 there are shown, in the form of flowcharts:
- the main steps E10 to E50 of the initialization process; and
- the main steps F10 and F20 of the updating process.

The management method according to the invention described here uses a fixed-size data structure.

Figure 2A:
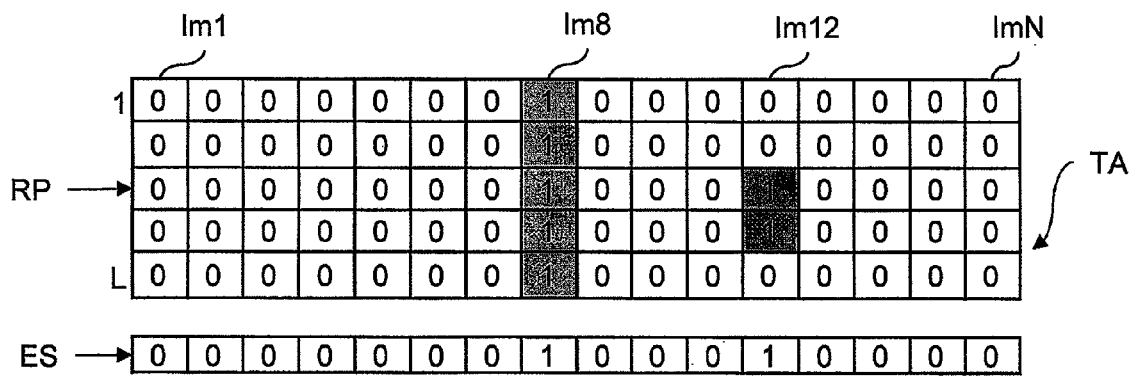
FIGS. 2A and 2B represent data structures that can be used in two variants of the FIG. 1 management method.

A first variant of the management method using the data structure TA from FIG. 2A is described below.

In this implementation, the fixed-size data structure is a bit matrix referred to as a "bitmap".

The bitmap described here takes the form of a matrix with L+1 rows and N columns.

Each of the N columns corresponds to an input that is directly addressable from the identifier of a flow. To this end the process for processing packets includes a first step E10 of obtaining, on reception of a packet, the image IM of the identifier of the flow of that packet.

In the context of the invention, the identifier of a flow corresponds to a combination of certain invariant fields of the header of its packets. In this example, the image of the identifier of the flow is an integer from 1 to N, where N is the number of columns in the data structure TA.

That image can typically be obtained by applying a hash function to the result of concatenating certain header fields of the packet.

The objective of this function is to associate each flow identifier with an integer IM uniformly and independently distributed between 1 and N.

A particular location in the data structure TA is determined in this way. That location corresponds to a set of bits (or a set of logic gates) referred to below as a flow register.

The value contained in this flow register (or the binary result of the logic functions) determines if a flow is active or not.

Accordingly, as emerges below, on each reception of a packet belonging to an active flow, or on the admission of a packet of a new flow, the L bits of the column indexed by the image IM of this flow in the structure TA are set to 1. In the context of the invention, this amounts to assigning a maximum credit to the flow of this packet.

The updating process, the objective of which is to reduce the credit of the flow regularly so that it expires at the end of the time-out period TO, consists of a loop including the following main steps:

a time-delay step F10, with a waiting time of TO/(L−1) seconds; and a step F20 of setting all the bits of a row RP of the table TA to the second binary value 0 and cyclically incrementing the value of this index RP, modulo L.

Thus if a flow does not receive packets during the last L operations of this type, all the bits of its flow register are set to 0. The flow is then recognized as new.

Since all the rows of the table TA are set to the second binary value 0 periodically, it is sufficient to test the state of only one bit, namely the bit in the row RP and the column indexed by the image IM of a flow, to determine whether the flow to which that packet belongs is new or not, because the value of this bit is equal to the second binary value 0 if and only if all the bits of this column are equal to that value.

The data structure TA is particularly advantageous because it is sufficient to count the number of bits set to the first binary value 1 in the row RP to determine the number of flows active at a given time.

As indicated above in relation to the general principle of the invention, a new flow may go undetected if its image coincides with the image of a flow that is already active.

A new flow will not be recognized as such if another active flow uses the same flow register: this constitutes a false positive error. In contrast, any flow signaled as new is certain to be new: there are no false negative errors. The person skilled in the art will understand that the false positive error rate can be controlled by choosing a dimension N sufficiently large as a function of the predicted parameters of the traffic.

Referring again to FIG. 1, the step E10 of obtaining an image IM of the identifier of the flow of the packet that has just been detected is followed by a step E20 during which the activity status of that flow is determined.

In the implementation described here, this step reads the value stored in the bit at the intersection of the row with the current index RP (this index being managed by the update process) and the column determined by the image IM of the identifier of this flow.

The flow is considered active (positive result of test E20) if this bit stores the first binary value 1. This test is then followed by a step E30 during which the credit representing the activity of this flow is initialized to its maximum value by setting all the bits of this column IM to the first binary value 1.

In contrast, if the value of the bit situated at the intersection of the row RP and the column IM is equal to the second binary value 0, the flow is considered not to be active. This test is then followed by an admission control test E40 during which whether this new flow is to be taken into account or not is determined.

In one implementation, the data structure TA also includes an $(L+1)^{th}$ row SA storing the activity summary of all the flows.

Each bit of this additional row SA stores the result of applying the OR logic operator to the first L rows of the structure.

This row can be read directly to determine the activity status of a flow.

The decision to take a new flow into account or not is not part of the invention. That decision can be taken as a function of the congestion status of a network link and other criteria, for example the class of service of the packet being processed.

If the flow is to be admitted, the result of the test E40 is positive. That test is then followed by the initialization step E30 already described.

If not, the result of the test E40 is negative and the packet is rejected with no other modification of the data structure TA.

Figure 2B:
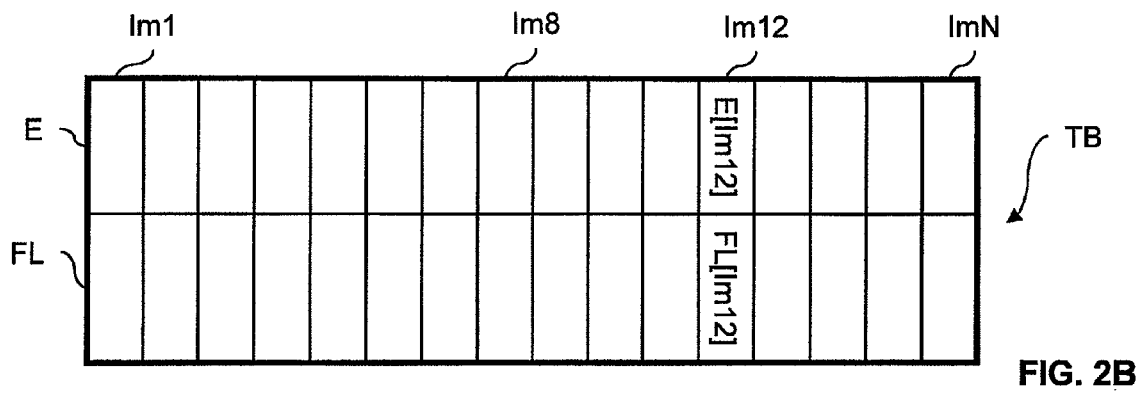

A second variant of the flow management method that uses the data structure TB from FIG. 2B is described below.

Like the data structure TA described above, the data structure TB includes N registers each of which can be addressed directly according to the image of the identifier of a flow.

In a first version of this variant, the data structure TB includes only one element per register, each of these elements storing a value representing the activity credit of a flow.

As described in detail below, the maximum credit assigned to a flow on detecting a packet belonging to an active flow or on admitting a packet of a new flow is equal to the value of a counter CR increased by a predetermined initial credit L.

The counter CR is incremented cyclically during an updating step so that the activity credit of the flow constituted at a given time by the difference between the content of the flow register and the current value of the counter expires at the end of the flow time-out period (to the nearest cycle value).

The main steps of the flow management method using the data structure TB from FIG. 2B are described below with reference to FIG. 1.

The waiting time during the time-delay first step F10 of the updating method is T0/(L−1). This time-delay step F10 is followed by a step F20 during which the value of a reference counter CR is incremented by the one unit. This incrementing is effected cyclically. Assuming that this counter is coded on W bits, it is incremented modulo $2^W$, the reference counter values being always between 0 and $2^W-1$.

The step E10 of obtaining the image of the identifier of the flow of a packet is exactly the same as that described above. It produces an integer IM from 1 to N for addressing the data structure TB directly.

The step E20 of determining the activity of the flow is effected by comparing the value stored in the flow register in the column of the data structure TB indexed by the image of the flow IM with the current value of the counter updated in the step F20 described above. In the description, E[Im] denotes the content of the flow register in the column IM.

Using this notation, the activity credit for a flow at a given time consists of the difference between the content E[Im] stored in the register of that flow and the current value of the counter CR. This difference is computed modulo $2^W$ during the step E20 of determining the activity of a flow, and the flow is considered active if this difference is strictly less than 0.

If so, the credit of the flow is initialized in the step E30 by resetting the flow register to the new value of the counter CR increased by L, modulo $2^W$.

Otherwise, if the flow is detected as new, there is a branch to the admission control step E40, as in the previous example, to determine whether this flow is to be taken into account or not.

If the flow is to be taken into account, its credit is increased in the step E30 by resetting the flow register to the current value of the counter CR.

If not, the packet is rejected (step E50) without modification of the data structure TB.

In a preferred version of this variant, and in order to reduce the probability of detecting false positive errors caused by looping of the counter CR, there is an additional condition for determining the activity of the flow. To this end, the data structure TB contains a second row FL each segment of which is initialized to the value 1.

The choice is made to store the value 0 in the segment FL[Im] of an image flow IM if admitted by the admission control process. Consequently, during the step E20 of detecting the status of a flow, a flow is determined to be active if two conditions are met, namely:

CR-E[Im]<0; and

FL[Im]=0.

In this implementation, if it is found during a step of determining the activity of a flow that the flow is extinguished (CR>E[Im]), the value of the flag FL[Im] is reset to 1.

In this implementation, the step F20 of the updating process, the object of which is to decrement the activity credits stored in the structure TB, increments a counter CR cyclically.

To be more precise, the time interval between two incrementations of the counter is fixed by the duration of the time delay of the time-delay step F10 of the same process.

In this implementation the value of the counter CR increased by a predetermined initial credit L is stored in a register of the data structure TB if a packet of an active flow is detected or to take a new flow into account.

In the invention, this register can be addressed directly. Its index is computed from the image value of the identifier of the flow of the packet, as in the FIG. 1A implementation.

Figure 3:
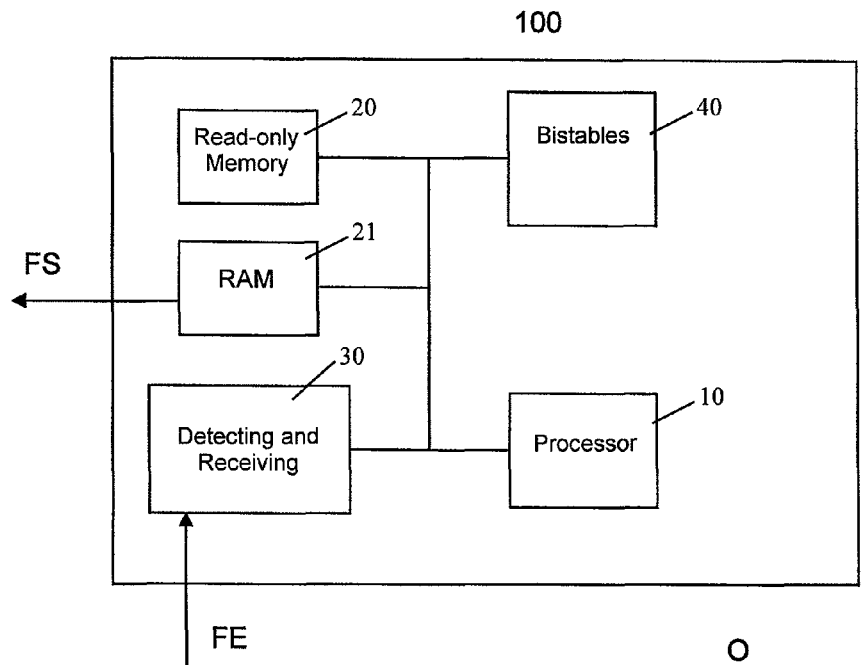
FIG. 3 represents a preferred embodiment of a flow management device of the invention.

FIG. 3 represents a preferred embodiment of a flow management device of the invention.

This device can be incorporated into a router, for example.

It includes a processor 10 adapted to execute a computer program stored in a read-only memory 20 for implementing the flow management method described above.

The device 100 also includes a random-access memory 21 needed to execute this program.

In FIG. 3 a flow FE of incoming packets into the device 100 is represented.

The device includes means 30 for detecting and receiving these packets.

In the implementation described here, when a packet is received, it is stored in registers of the random-access memory 21. Packets that are not rejected are subsequently read out of this random-access memory. They constitute an output flow FS.

In the invention, the computer program stored in the read-only memory 20 includes a routine for computing an image value of the identifier of the flow of a packet. This routine uses a hash function applied to the result of concatenating certain fields of the header of this packet, for example.

The computer program stored in the read-only memory 20 includes two main routines for initializing and updating the activity criteria of the flows.

In the preferred implementation described here, these operations are effected by sending pulses to the inputs of a set 40 of bistables 50 described below with reference to FIGS. 4a and 4b.

Figure 4A:
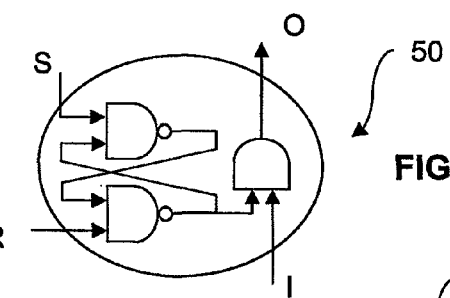
FIGS. 4A and 4B respectively represent a bistable and a set of these bistables used in the FIG. 3 device.

FIG. 4a represents a bistable 50 for storing one information bit with two inputs R, S and an output O.

As the person skilled in the art knows, a pulse fed to the set input S induces a 1 at the output 0.

Similarly, a pulse at the reset input R induces a 0 at the output 0. This output and an input I are fed to an OR gate.

Figure 4B:
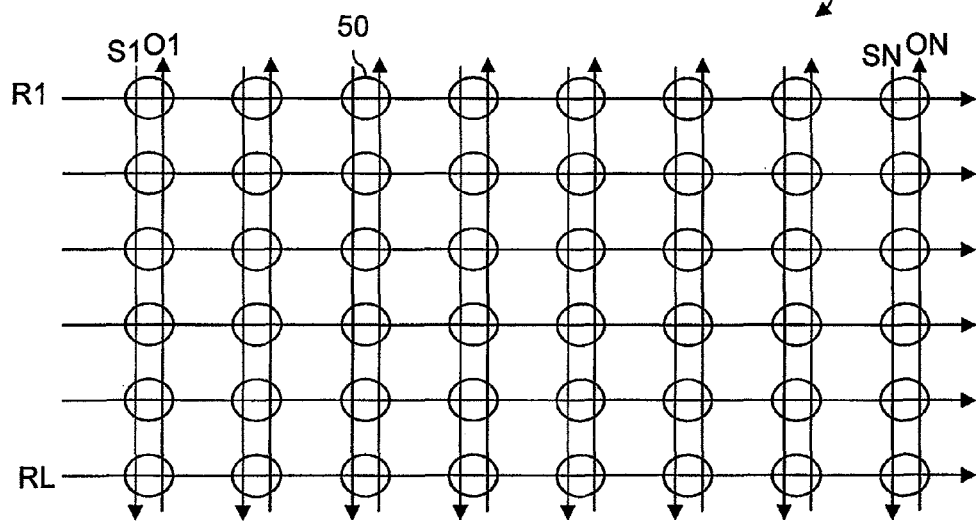

These logic gates are associated in accordance with the matrix 40 of L rows and N columns represented in FIG. 4b. This materializes, in the form of a set of logic gates, the data structure TA described above with reference to FIG. 2A.

The inputs S1 to SN set all the bits of a column to 1 (the first binary value). Thus the activity credit is initialized by the initialization routine sending a pulse to the corresponding input.

The inputs R1 to RN simultaneously reset the state of a row of the matrix to 0 (the second binary value).

Thus on each time-out the updating routine generates a pulse at the corresponding input which resets to 0 the row of the bit map indexed by the counter RP.

In a preferred implementation, the computer program stored in the read-only memory 20 includes a routine for determining the activity status of a flow.

The person skilled in the art will understand that the activity status of an image flow IM is read at the output OIm that carries the result of applying the OR operator to all the bits of a column of the bitmap.

The computer program preferably includes a routine for controlling the admission of a packet if it belongs to a new flow, which amounts to determining if that flow is to be taken into account or not.

If so, the computer program executes the activity credit initialization routine for that flow.

If not (the packet is rejected), the data structure 40 is unchanged.

The frequency of updating the activity credits can advantageously be modified over time, and in particular increased in line with traffic activity to reduce the time-out period of the flows of the network.

The invention claimed is:

1. A method of managing the activity status of flows in a packet-switched telecommunications network, a flow being considered active in said network if a time elapsed since detection of the last packet of the flow is less than a predetermined time-out period, said method comprising, for each packet received belonging to the flow:

a step of determining, from an identifier of said flow, a location of a register for said flow in a data structure of fixed size, each flow register including an identical predetermined number of bits, said data structure including a plurality of flow registers configured to store a value representing the activity of said flow;

an initialization step during which a first binary value is stored in each of said bits in each of said plural flow registers;

a pointing step using an index for pointing toward a bit of each of said plural flow registers in said data structure;

wherein the method further comprising:

an updating process that stores a second binary value in each bit pointed to by said index for each of said plural flow registers and that cyclically increments a value of said index at a given frequency; and a step of determining an activity status of said flow using a value stored in the bit pointed to by said index for a flow register of said plural flow registers having the location in said data structure which is determined by an identifier of said flow.

2. The method according to claim 1, including a step of computing an image value of the identifier of said flow using a function for associating with flow identifiers image values belonging to a finite set of image values to which correspond respective directly addressable inputs of the fixed-size data structure.

3. The method according to claim 1, further comprising:
  if the flow is determined to be inactive during the step of determining the activity status of the flow, a step of controlling admission of said flow; and
  carrying out the initialization step if the flow is admitted.

4. A device for managing the activity status of flows in a packet-switched telecommunications network, a flow being considered active in said network if a time elapsed since detection of the last packet of that flow is less than a predetermined time-out period, said device comprising:
  a data structure of fixed size, said structure including a plurality of flow registers configured to store a value representing the activity of the flow, each of said plural flow registers including an identical predetermined number of bits;
  means for receiving packets;
  means for determining, from a flow identifier of a packet, the location of the flow register in said data structure;
  initialization means configured to store a first binary value in each of said bits of each of said plural flow registers;
  updating means configured to store a second binary value in each bit pointed to by an index for each of said plural flow registers and to cyclically increment a value of said index at a given frequency; and
  means for determining an activity status of said flow using the value stored in the bit pointed to by said index for a flow register of said plural flow registers having a location in said data structure which is determined by an identifier of said flow.

5. The device according to claim 4, including means for computing an image value of the identification of said flow using a function for associating with flow identifiers image values belonging to a finite set of image values to which there correspond respective directly addressable inputs of the fixed-size data structure.

6. The device according to claim 4, comprising:
  means for controlling the admission of the flow if it is determined to be inactive.

7. The device according to claim 4, wherein said data structure comprises a set of bistables for storing a bit of said structure, each bistable having two inputs and an output,
  wherein said initialization means are configured to generate a pulse at a first input to induce a first signal representing said first binary value at said output; and
  wherein said updating means are configured to generate a pulse at a second input to induce a second signal representing said second binary value at said output.

8. A non-transitory computer-readable information medium comprising instructions of a computer program stored on the information medium, wherein said program includes instructions configured to execute a method of determining the activity of a flow according to claim 1.

9. A router comprising a device for managing the activity status of flows in a packet-switched telecommunications network according to claim 4.

10. The method according to claim 1, wherein said step of determining the activity status of said flow comprises reading directly a value storing a result of an OR operation applied to all the bits of the flow register.

* * * * *